May 22, 1951  G. W. GRAY  2,553,574
GAUGE CONSTRUCTION
Filed July 3, 1946
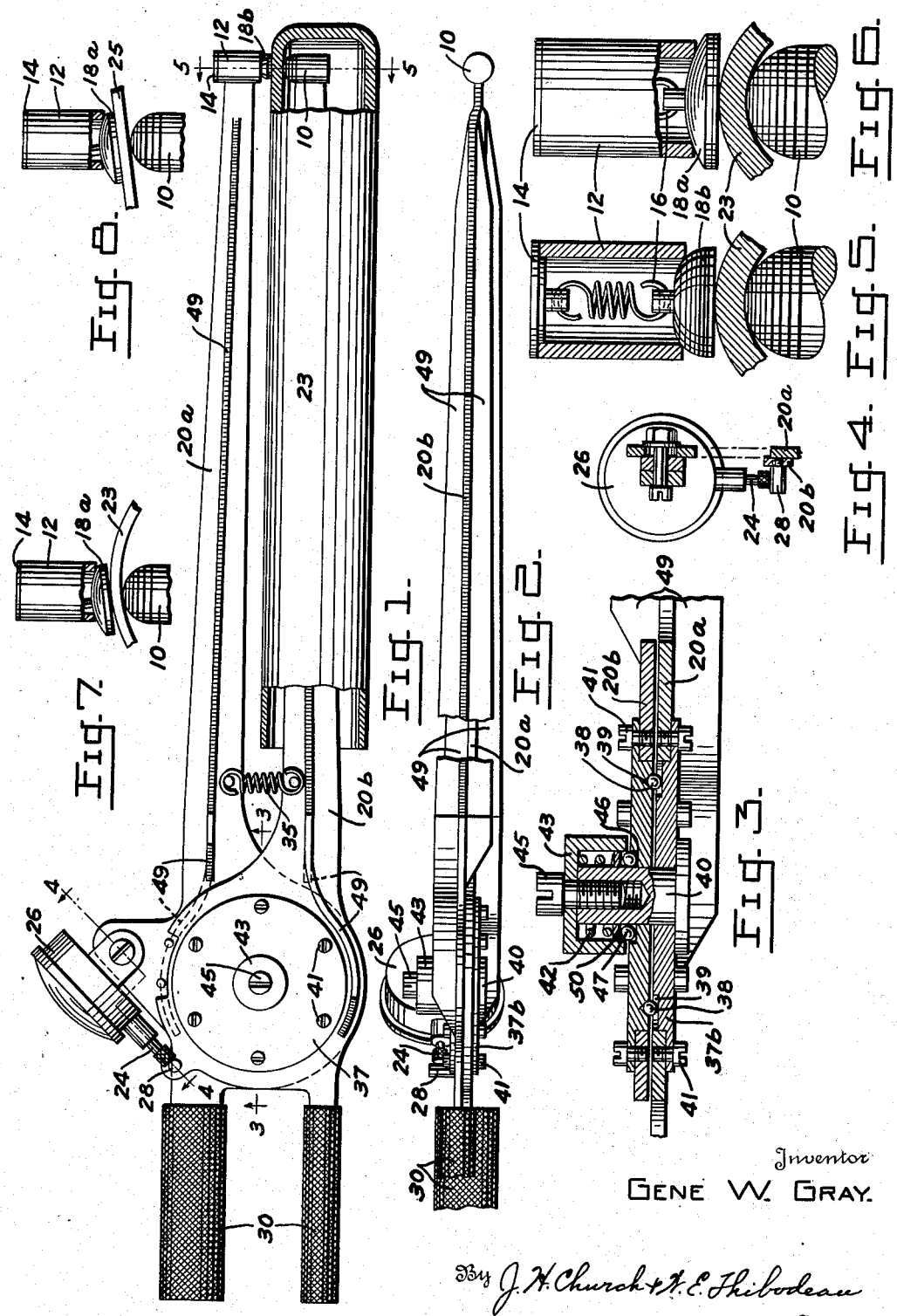
Inventor
GENE W. GRAY.
By J. H. Church & N. E. Thibodeau
Attorneys Patented May 22, 1951

2,553,574

UNITED STATES PATENT OFFICE 2,553,574

GAUGE CONSTRUCTION

Gene W. Gray, North Hills, Pa.

Application July 3, 1946, Serial No. 681,280

5 Claims. (Cl. 33—148)

(Granted under the act of March 3, 1883, as amended April 30, 1928; 370 O. G. 757)

The invention described herein may be manufactured and used by or for the Government for governmental purposes without the payment of any royalty thereon.

My invention relates to caliper, snap and other gages having contact points, and it has special reference to means for eliminating the necessity of keeping the contact points perpendicular to the work to be gaged without sacrificing gaging accuracy.

Broadly stated, the object of my invention is to improve the operating effectiveness of gages employing opposing contact points.

A more specific object is to provide means by which accurate readings of a material's thickness or length may be had even though both long axes of a gage's opposing contact points are not perpendicular to the work being gaged.

Another object is to provide means for minimizing "play" in the arms of caliper gages and consequently reducing misalignment of the opposing contact points on the ends of those arms.

A further object is to provide gage constructions of improved design and enhanced usefulness.

One more object is to decrease the skill and time necessary to make readings with such gages.

In practicing my invention I attain the foregoing and other objects and advantages by providing contact points for gages which have the unique construction and superior ability to compensate for errors in positioning the gage presently to be described. In addition, I have provided further aid to the improved operation of those gage points (as used in caliper gages) in the form of the novel construction for joining together the two movable, "scissors-like" arms. Although this pivot means is not a part of the invention claimed in this case, for the sake of completeness it will be described below. One preferred form of my improved device is shown by the accompanying drawings wherein:

Fig. 1 is a side view of a conventional caliper gage which bears my improvements, showing the gage in position to measure the wall thickness near the closed base of a long tube, the two caliper arms both being parallel to each other and to the surfaces of the material being gaged;

Fig. 2 is a view from the bottom of the Fig. 1 caliper gage, the long closed base tube having been removed;

Fig. 3 is a section taken along line 3—3 of Fig. 1 to show constructional details of the earlier mentioned means for joining together the illustrated movable caliper arms;

Fig. 4 is a section from line 4—4 of Fig. 1 showing details of the dial indicator's assembly on the illustrated caliper gage;

Fig. 5 is a view in section from line 5—5 of Fig. 1 showing constructional details of my novel compensating gage contact points;

Fig. 6 is a view similar to that of Fig. 5 but illustrating an alternate construction of my new "floating" type gage contact points;

Fig. 7 shows the Fig. 6 gage points when the gage arms are not held perpendicular to the work at the point of contact, illustrating the manner in which errors in positioning the gage by the operator are automatically compensated for by the gage contact points themselves; and Fig. 8 is a view similar to Fig. 7 showing a standard test bar being measured instead of the tubular object.

Problem to be solved

Although the problem solved by my invention is one common to gages of different types including caliper, snap and other gage designs, it most frequently recurs in the case of the long-armed caliper gages. It is for this reason that my improved gage contact points have here been shown applied to such caliper gages for purposes of illustration.

The operation of such gages is very much like that of conventional snap gages. The material whose thickness is to be gaged is placed between the contact points which are thereby diverged. Attached to the arm or holder of one of the thus diverged contact points is the stem 24 of a conventional dial indicator gage 26 (see Fig. 1) which is moved up or down as the divergence increases or decreases, the differences being notable on the dial indicator.

As will be obvious, to measure the actual thickness of a material, it is important to have the opposing gage contact points perpendicular to the surfaces of the material being gaged. If otherwise, the distance between the two points will be greater than the actual thickness of the material therebetween, and inaccurate readings or measurements of the material will result.

With snap gages, or with caliper gages having relatively short arms, the problem of maintaining the gage contact points perpendicular to the work being gaged is somewhat less difficult. However, as the arms are lengthened to proportions like those shown in the drawings, this problem becomes increasingly greater and at the same time the gage's accuracy steadily drops.

To avoid this trouble, the gage arms should maintain a substantial alignment with each other, thereby enabling the contact points to be essentially perpendicular to the gaged surfaces (as in Figs. 1, 5 and 6). Instead, the gage arms or the work held between them become misaligned with respect to each other in one of many possible directions to assume non-perpendicular relationships typically illustrated by Figs. 7 and 8. No matter how skilled the operator, nor how carefully he tries to position the arms with respect to the work to be gaged, this misalignment so frequently occurs that gaging tolerances have to be broadened in order to permit making any use of the gage itself.

*Problem emphasized by actual test data*

Appreciation of the significant variations from actual thicknesses which are caused to be measured by such relative misalignment between the gage arms and the work to be gaged will be had by reference to actual test results. In making these tests, a caliper gage having a pair of conventional stationary contact points 10 (only one is shown in the illustrated improved gage) was used. The lower arm 20b of this gage was clamped in a vise (not shown) in the horizontal position shown by Fig. 1. A "standard" gage test bar (represented as 25 in Fig. 8) of known dimensions was then inserted between the two contact points 10 so that the surfaces of the bar thus contacted were also perfectly horizontal. Then the indicator gage 26's dial (not shown) was set so that the gage's indicator (also not shown) coincided with the zero reading on the dial.

With the gage and test bar thus set up, the long axes of the opposing contact points 10 were both perpendicular to the opposite surfaces of bar 25 which was being gaged, and the zero reading indicated that the contact points were diverged a distance exactly equal to the thickness of the test bar 25. If the divergence between the contact points was increased, same was recorded on the dial indicator gage 26 as so many parts of an inch in excess of the test bar's actual thickness.

The test bar 25 was then inclined at measured angular distances (as in Fig. 8) from the original horizontal position. Such inclination disrupted the perpendicular relationships of the contact points with the test bar, and caused the old-type contact points to diverge. This divergence caused deflections of the indicator (not shown) from the preset zero on the indicator gage 26, which were noted and recorded as described above. Typical of the results were the following measurements made at 5° intervals of the test bar's inclinations:

At 0°—no deflection
    5°—no deflection
   10°—+0.009
   15°—+0.020

*My invention has satisfactorily solved the problem*

Using a similar caliper gage improved by my invention, under conditions identical with those just described, there is a marked improvement in gaging accuracy as typically shown by the following actual test results:

At 0°—no deflection
    5°—no deflection
   10°—+.001
   15°—+.0027

The ability to obtain with my device gage readings that show greatly decreased deviations from actual thickness over those determined by the prior art apparatus, as a comparison of the foregoing two sets of data will show, is a very important advantage of my invention. The construction of my improvement, presently to be described, makes possible this advantage because it enables the opposing gage points to constantly contact the opposite sides of the material being gaged at the ends of a line representing the perpendicular to each of the material's two surfaces at the points of such contact.

This contact of the gage points is maintained even though the work being gaged should become misaligned with respect to the parallel-aligned gage arms, so that they fail to assume a perpendicular relationship to each other. My new device automatically compensates for this misalignment within certain pre-determined limits. From the ensuing description of the device's construction, the manner in which this automatic compensation is effected will become clear.

*My compensating gage point's construction*

As earlier mentioned, the caliper gage with which my improvements are here illustratively shown is a conventional prior art apparatus. It consists of two arms, an upper arm 20a to which is attached the dial indicator gage 26, and a lower arm 20b which bears a projection 28 with which gage 26's stem 24 is in constant register (see Figs. 1 and 4). The two arms terminate on one end in handles 30, and on the other end in contact points which project inwardly from each arm toward each other. Somewhere in between the two ends of those arms, at a point dependent upon the length of the arm required to permit its penetrating within long containers, the arms are movably fastened together in scissors-like fashion. One or more springs 35 can suitably be employed as shown in Fig. 1 to constantly urge the opposing gage arms and contact points toward each other upon divergence thereof.

Previous to my invention, such devices generally have been supplied with an opposing pair of stationary, rounded or spherical-tipped contact points similar to the one represented at 10 in Figs. 1, 5-6-7. The round surface is advantageous in order to permit the gaging tip to contact the surface of a material to be gaged which may be concave as, for example, the interior wall of a tube (see 23 in Figs. 1, 5 and 6). However, flat stationary surfaces (for gaging flat objects such as test bar 25 in Figs. 7-8), roller or ball bearing contact points are also well known to the art and may be used to reduce the amount of wear, if desired.

Regardless of which of these just mentioned or even other types of contact points are used on one arm of the gage, my improved contact point on the other arm will render the superior performance over prior art devices earlier described. Thus, my improvement may be readily substituted for any one of the less accurate conventional contact points in existing gages just as easily as it can be incorporated in entirely new gage designs and constructions.

My novel contact point actually comprises the cylindrical housing 12, the housing cap 14, spring 16 and gaging "button" 18a or 18b shown in Figs. 1, 5-6-7-8. These parts, arranged as shown, give to the contact point a sort of "floating" characteristic. This permits the gaging button (either 18a or 18b whichever is used) to remain in constant contact with the work being gaged despite movement of either the work (tube 23 in Figs. 1, 5-6-7 or test bar 25 in Fig. 8) or the gage arms.

This ability of the gaging button enables it to "follow" movement of the work. Thus, the distance between that button's gaging under surface and the new point of contact with the spherical surface of the stationary contact point 10 always remains substantially identical with the distance between those two members prior to the relative misalignment between the work and the gage arms. That is to say the distance between the button and spherical point 10 is maintained practically constant even though the work (tube 23 or bar 25) is moved therebetween from the perpendicular relationships with the gage arms represented by Figs. 1, 5 and 6 to the non-perpendicular relationships indicated by Figs. 7 and 8.

As a result of this distance remaining substantially constant, there is practically negligible divergence of the gage arms in excess of the distance represented by the actual thickness of the work (23 or 25) being gaged. Hence, when the dial indicator gage 26 is pre-set at zero to represent the required thickness of a material desired to be gaged (as earlier explained), there is essentially little deflection of the indicator (not shown) even though the work is not perfectly perpendicular to the gage arms, as was so necessary to accurate gaging with gages using the prior art, immovable, paired contact points. In addition to improvements in accuracy, the readings are obtainable in much less time than heretofore. This is because the readings can be taken as soon as the gage is applied to the work and without "juggling" to establish a perpendicular relationship between the gage and the work.

The "floating" gaging button may preferably have either of the two shapes represented in Figs. 5-6-7-8. The button 18a in Figs. 6-7-8 is specially shaped so that, when used to gage a certain thickness of material, its upper curved surface will have a center of curvature that coincides with the center of curvature of contact point 10. For gaging different thicknesses it will, of course, be necessary to use buttons having a different curvature in order that the curvature center thereof will substantially coincide with the curvature center of contact point 10 during the gaging operation. Although the said two centers of curvature will exactly coincide at only one relative position of closure of the gage arms, for measuring given thicknesses within certain limited tolerances the two centers need not be exactly coincident at all times to give results within acceptable percentages of error. This button 18a has been found especially useful and accurate in gaging work within a relatively narrow range of thicknesses for which the button's size is particularly designed.

The button 18b shown in Fig. 5 is shaped like the frustum of a cone, but having convex instead of straight side walls. It is actually made up of a radius and an upper flat surface empirically determined to give accurate readings when used to gage a relatively broad range of thicknesses. The exact shape of such a button which can make possible the widest attainment of such optimum utility is believed to be determinable by application of a rather complex mathematical formula. However, same need not be discussed here, for the model represented by Fig. 5 was worked out empirically and has performed quite satisfactorily, and the same empirical methods may be successfully followed by anyone thus practicing my invention.

Certain further modifications of my improvement which may be utilized will become obvious to those generally skilled in the gage design art. For example, the stationary contact point 10, shown in the drawings to be spherical, may instead be a rounded edge of a flat surface. Or, if desired, in preference to retaining one stationary contact point as described, both points may be made of my novel "floating" design which includes button 18a or 18b as aforesaid.

*My improved pivotable gage arm jointure*

To further improve the accuracy attainable with my unique and superior "floating" contact points when used in caliper gages, I have devised means for reducing friction of the gage arms' rotatable jointure. As above mentioned, although this pivot means is not a part of the invention claimed in this case, it is described hereinbelow for the sake of completeness. The improvement to gaging accuracy contributed by this pivot means resides in the enhanced ability of the two arms to be brought together without developing "bends" in the gage arms, thereby enabling the opposing contact points to meet in one plane as nearly as possible.

The described improvement is achieved by means of the broad circular plates 37 and the ball-bearing mountings best shown by Figs. 1 and 3. One set of ball-bearings 38 fills the circular races 39 formed between upper plate 37a and lower plate 37b shown in Fig. 3. This provides substantially friction free turning movement by the gage arms 20a and 20b which are attached to the corresponding plates 37 by screws 41 (as shown in Fig. 3) about the axle-like post member 40. This post member 40, besides serving as a pivot center for the gage arms and plates 37, serves to support a spring 42 therearound and a housing 43 therefor. The housing is fastened onto member 40 by a screw 45 which passes through a hole in the housing's base.

A circular channel 46 cut into the top surface of upper plate 37a adjacent the post member 40 (see Fig. 3) is filled with another set of ball bearings 47. Separating these bearings 47 and spring 42 is a washer 50 which encircles post 40. When spring 42 is compressed by housing 43, the spring presses against washer 50 which in turn rides on bearings 47. Neither the spring 42 nor the housing 43 contacts plate 37a, thus a substantially friction-free jointure is provided for the two plates 37 and gage arms attached thereto.

Heretofore, the prior art constructions generally relied upon a rivet or nut and bolt arrangement (not shown) to join the two gage arms in "scissors-like" fashion. This arrangement was unsatisfactory in that it was a source of constant friction between the arms and the jointure means. Furthermore, the customary slender rivet or bolt which joined the arms generally wears in time and results in the development of a certain amount of "play" between the gage arms.

The improved jointure construction just described not only minimizes friction as aforesaid, but also reduces the chances for such "play" by means of the broad supporting circular plates 37. This is achieved by reason of the "extra" radial length of these plates over the breadth of the old type rivet or bolt, the wider plates serving as so much additional support for holding the gage arms together.

To further assist the broadened plates 37 in minimizing "play" and maintaining stability between the gage arms, I have additionally modified existing caliper gage design by increasing the length of ribs 49 beyond their conventional dimensions. Conventionally, these ribs 49 project perpendicularly from the linear portion of arms 20a and 20b, their purpose being to lend added rigidity to the arms and reduce bending thereof. My improvement therein consists of extending these ribs 49 on the gage arms circular-wise around the margin of circular plates 37 as shown in the drawings. These extensions further serve the purpose of making the gage arms rigid in a superior manner, especially since they are continued (as shown) past the fulcrum point of jointure between the two arms.

Summary

From the foregoing it will be seen that by my improved gage constructions here shown and described I have provided means for eliminating the necessity for keeping the contact points perpendicular to the work to be gaged without sacrificing gaging accuracy; that I have improved the operating effectiveness of gages employing opposing contact points; that I have provided means by which accurate readings of a material's thicknesses or length may be had even though both long axes of a gage's contact points are not perpendicular to the work being gaged; that I have provided means for minimizing "play" in the arms of caliper gages and consequently reducing misalignment of the opposing contact points on the ends of those arms; that I have provided gage constructions of improved design and enhanced usefulness; and that I have decreased the skill and time necessary to make readings with such gages.

It will further be evident to those skilled in the art that my invention can be practiced by varying the constructions shown wtihout departing from the spirit and intent of my improvements. My invention is therefore extensive in its adaption and is not to be restricted to the specific form here shown by way of illustration.

I claim:

1. In a gaging device having first and second arms that are adjustably separated one from the other to provide a gaging aperture for measuring work held between opposed gaging faces of the arms, the combination of an indicator gage mechanism associated with said arms so as to measure the gaging aperture distance therebetween, a contact point member attached to and projecting from the first of said arms in the direction of said second arm's gaging face and terminating in a rounded gaging surface, a cup-like housing attached to the second of said arms with its open end projecting therefrom in the direction of said first arm's gaging face and aligned in opposition with said contact point member when said work is being gaged, a spring attached by its first end within said housing, and a substantially spherical segment-shaped "button" having a spherical surface and a flat gaging surface of which surfaces the former is attached to the second end of said spring to thereby be urged into constant abutting relationship with the end walls of said housing's open end thus substantially to maintain, for a given thickness of said work, the "button's" flat gaging surface at a constant distance from and parallel to a tangent on the rounded gaging surface of said contact point member notwithstanding any cocking of the "button" with respect to its mounting in said housing, and therefore resulting in the maintenance of a constant perpendicular distance between the respective points of contact of the two gaging surfaces with said work whether the plane of the work's surfaces thus contacted are in a perpendicular or non-perpendicular relationship with respect to said opposing housing and contact point member.

2. In a gaging device comprising a frame having first and second arms that are adjustably separated one from the other to provide a gaging aperture for measuring work held between opposed gaging faces of the arms, the combination of an indicator gage mechanism associated with said arms so as to measure the gaging aperture distance therebetween, a contact element attached to and projecting from the first of said arms in the direction of said second arm's gaging face and terminating in a spherical gaging surface, a cup-like housing attached to the second of said arms with its open end projecting therefrom in the direction of said first arm's gaging face and aligned in opposition with said contact element when said work is being gaged, a spring extending axially within said housing and attached at its first end to the housing's closed base, and a substantially spherical segment-shaped gaging "button" having a spherical surface and a flat gaging surface of which surfaces the former is centrally attached to the second end of said spring to thereby be urged into constant abutting relationship with the rim of said housing's open end thus substantially to maintain, for a given thickness of said work, the "button's" flat gaging surface at a constant distance from and parallel to a tangent on the spherical gaging surface of said contact point member notwithstanding any cocking of the gaging "button" with respect to its mounting in said housing, which in effect accomplishes the maintenance of a constant perpendicular distance between the respective points of contact of the two gaging surfaces with said work whether the plane of the work's surfaces thus contacted are in a perpendicular or non-perpendicular relationship with respect to said opposing housing and contact element.

3. In a gaging device comprising a frame having first and second arms that are adjustably separated one from the other to provide a gaging aperture for measuring work held between opposing faces of the arms, the combination of an indicator gage mechanism associated with said arms so as to measure the gaging aperture therebetween, a contact point member attached to and projecting from the first of said arms in a direction facing said second arm and terminating in a spherical gaging surface, a cup-like housing attached to the second of said arms with its open end projecting therefrom in a direction facing said first arm and aligned in opposition with said contact point member, a spring extending axially within said housing and attached at its first end to the housing's closed base, and a gaging "button" shaped like the frustum of a cone but having convex instead of straight side walls and a flat apical non-gaging surface by which it is attached to the second end of said spring which thereby urges the "button's" convex side walls into constant abutting relationship with the rim of said housing's open end thus substantially to maintain, for a given thickness of said work the "button's" flat base surface, which comprises a gaging surface, at a constant distance from and parallel to a tangent on the spherical gaging surface of said contact point member notwithstanding any cocking of the gaging "button" with respect to its mounting in said housing, and therefore accomplish the maintenance of a constant perpendicular distance between the respective points of contact of the two gaging surfaces with said work whether the plane of the work's surfaces thus contacted are in a perpendicular or non-perpendicular relationship with respect to said opposing housing and contact point member.

4. In a gaging device comprising a frame having a pair of arms that are adjustably separated one from the other to provide a gaging aperture for measuring work held between opposing faces of the arms, the combination of a pair of coaxially opposed gaging contact points at least one of which is comprised of a cylindrical housing having a hollow concavity open on the end facing the other contact point, resilient means attached by its first end within said housing's concavity, and a substantially spherical segment-shaped "button" whose rounded surface is attached to the second end of said resilient means to thereby be urged into movable but constant abutting relationship with the rim of said housing's open ends.

5. A gage having a pair of gaging contacts mounted for movement toward and away from each other, each contact having a gaging surface, one of said gaging surfaces being substantially hemispherical and the other of said gaging surfaces being flat, that part of the gage on which said flat gaging surface is mounted having an opening in it provided with a ring-shaped seat, a gage element of which said flat gaging surface is a part and having a curved surface normally contacting with said ring-shaped seat and providing for tilting movement of said flat gaging surface upon said ring-shaped seat without affecting the accuracy of the gage, and a spring stressing said gage element against said ring-shaped seat.

GENE W. GRAY.

REFERENCES CITED

The following references are of record in the file of this patent:

UNITED STATES PATENTS

| Number | Name | Date |
| --- | --- | --- |
| 458,684 | Morris | Sept. 1, 1891 |
| 635,088 | Bowker | Oct. 17, 1899 |
| 649,934 | James | May 22, 1900 |
| 1,789,942 | Long | Jan. 20, 1931 |
| 1,910,467 | Heckersdorf et al. | May 23, 1933 |
| 2,220,040 | Hathaway et al. | Oct. 29, 1940 |
| 2,364,805 | Nash | Dec. 12, 1944 |
| 2,383,742 | Russell | Aug. 28, 1945 |

FOREIGN PATENTS

| Number | Country | Date |
| --- | --- | --- |
| 88,008 | Switzerland | Jan. 17, 1921 |

OTHER REFERENCES

Pamphlet, Standard Super Snap Gage, June 3, 1943.

Popular Mechanics Magazine, July 1943, page 140.